United States Patent
Vogt

(10) Patent No.: US 7,269,876 B2
(45) Date of Patent: *Sep. 18, 2007

(54) WINDOW AND LENS GLASS CLEANING SYSTEM

(75) Inventor: Gerhard Vogt, Bebra (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/466,723

(22) Filed: Aug. 23, 2006

(65) Prior Publication Data

US 2007/0050936 A1    Mar. 8, 2007

Related U.S. Application Data

(63) Continuation of application No. 10/131,891, filed on Apr. 24, 2002, now abandoned, which is a continuation of application No. 09/360,355, filed on Jul. 22, 1999, now Pat. No. 6,393,652.

(30) Foreign Application Priority Data

Jul. 23, 1998 (DE) ................. 198 33 142

(51) Int. Cl.
*B60S 1/46* (2006.01)
*B60S 1/52* (2006.01)
*B60S 1/24* (2006.01)

(52) U.S. Cl. ............... 15/250.04; 15/250.01; 239/284.1; 239/130; 239/135; 239/570; 239/571

(58) Field of Classification Search ......... 15/250.01, 15/250.02, 250.04, 250.05, 250.07; 239/284.1, 239/284.2, 570, 571, 135, 130
See application file for complete search history.

(56) References Cited

U.S. PATENT DOCUMENTS

| 2,196,551 | A | * | 4/1940 | Fischer et al. | 15/250.04 |
| 3,199,787 | A | * | 8/1965 | Oishei et al. | 239/284.1 |
| 3,574,883 | A | * | 4/1971 | Brittain et al. | 15/250.02 |
| 3,608,793 | A | * | 9/1971 | VanLobenSels | 222/490 |
| 4,212,425 | A | * | 7/1980 | Schlick | 239/133 |
| 4,967,437 | A | * | 11/1990 | Morse | 15/250.07 |
| 5,327,614 | A | * | 7/1994 | Egner-Walter et al. | 15/250.04 |
| 5,383,602 | A | * | 1/1995 | Edele et al. | 239/284.1 |
| 5,462,208 | A | * | 10/1995 | Stahley et al. | 222/207 |
| 5,636,794 | A | * | 6/1997 | Hess et al. | 239/284.1 |
| 6,155,299 | A | * | 12/2000 | Martin | 137/846 |
| 6,393,652 | B1 | * | 5/2002 | Vogt | 15/250.04 |

FOREIGN PATENT DOCUMENTS

| DE | 81058268 | * | 7/1982 |
| DE | 3544589 | * | 6/1987 |
| DE | 8704535 | * | 12/1987 |
| DE | 4025732 | * | 2/1992 |

(Continued)

*Primary Examiner*—Gary K. Graham
(74) *Attorney, Agent, or Firm*—Hanley, Flight & Zimmerman, LLC

(57) ABSTRACT

In a window and lens glass cleaning system for a window/lens glass of a motor vehicle, a washer nozzle, a heating element and a nonreturn valve are in each case arranged on or in a retaining part. The retaining part is fastened on a wiper arm which can pivot over the window/lens glass. The invention largely prevents washer fluid in the washer nozzle from freezing.

10 Claims, 2 Drawing Sheets

FOREIGN PATENT DOCUMENTS

| | | | |
|---|---|---|---|
| DE | 19744040 | * | 4/1999 |
| EP | 0174521 | * | 8/1985 |
| EP | 0442270 | * | 8/1991 |
| EP | 0566470 | * | 4/1993 |
| EP | 0667267 | * | 8/1995 |
| FR | 2675445 | * | 10/1992 |
| WO | 96/22203 | * | 7/1996 |

* cited by examiner

WINDOW AND LENS GLASS CLEANING SYSTEM

This is a continuation of Application No. 10/131,891 filed on Apr. 24, 2002, now abandoned which is a continuation of Ser. No. 09/360,355, filed on Jul. 22, 1999 (U.S. Pat. No. 6,393,652.

FIELD OF THE INVENTION

The present invention relates to a window and lens glass cleaning system for a window/lens glass of a motor vehicle, having a pivotally mounted wiper arm for holding a wiper lip, which slides over the window/lens glass, in the intended installation position, and having at least one washer fluid pipe which is arranged on the wiper arm and is routed to a washer nozzle which is directed onto the window/lens glass, washer fluid situated in the washer nozzle and/or the washer fluid pipe being heatable.

BACKGROUND OF THE INVENTION

Window and lens glass cleaning systems of this type are used for motor vehicle windshields or rear windows or for headlight lenses, and are known from practical experience. In this case, the washer nozzles are supplied with washer fluid by a washer fluid pump arranged in a washer fluid tank. The arrangement of one or more washer nozzles along the wiper arm has the advantage that particularly little washer fluid misses the wiping region of the wiper lip or gets onto the rear side of the wiper arm. Since in this case the washer nozzle is arranged at a particularly small distance in front of the window/lens glass and the washer fluid jet emerging from the washer nozzle is particularly highly pressurized in the region of the window/lens glass, in addition dirt adhering to the window/lens glass can be dissolved by the washer fluid jet.

The washer nozzles are directly exposed to the airstream and so the result of washer fluid emerging is that it is evaporated and therefore the washer nozzles are severely cooled. Since frequently additives of cleaning agents having a low boiling point are mixed in the washer fluid, the washer nozzle can also freeze at temperatures above 0° C. Since air can enter into the washer fluid pipe through the washer nozzle when the washer fluid pump is switched off, the washer fluid pipe is furthermore severely cooled in particular at low outside temperatures. When the washer fluid pump is switched on again, this can likewise result in the washer nozzle freezing. As a result, reliable wetting of the window/lens glass with washer fluid is no longer ensured. Because of that, there is the risk of the wiper lip being moved over the still dry window/lens glass and thereby very rapidly becoming worn. Thus, there is a need for a window and lens glass cleaning system to overcome the aforementioned problems.

Other needs will become apparent upon a further reading of the following detailed description taken in conjunction with the drawings.

SUMMARY OF THE INVENTION

The invention is based on the problem of configuring a window and lens glass cleaning system of the type mentioned at the beginning in such a manner that even at low outside temperatures the window/lens glass is reliably wetted with washer fluid and the washer-lip wear is kept particularly low.

According to the invention, this problem is solved in that a nonreturn valve is arranged directly in front of the washer nozzle, as seen in the direction of flow, and an electric heating element is arranged near to the washer nozzle.

This configuration enables the washer nozzle to be heated to a designated temperature so that the risk of the washer fluid freezing is kept particularly small. Since the heating element is arranged near to the washer nozzle, heating energy losses are kept particularly small. In addition, rapid heating of the washer nozzle, for example during evaporative cooling, is ensured. Furthermore, air can only penetrate into the region, which owing to the invention is kept small, as far as the nonreturn valve after washer fluid which is situated in said region has emerged through the washer nozzle. The washer nozzle is thereby only insignificantly cooled. Furthermore, the close arrangement of the nonreturn valve to the washer nozzle means that the delay in the washer fluid emerging when the washer fluid pump is activated is particularly small. By this means, the window/lens glass is reliably wetted with washer fluid after the washer fluid pump is switched on, and therefore the wiper-lip wear is kept particularly low.

The window and lens glass cleaning system according to the invention is particularly cost-efficient if the washer nozzle together with the heating element and the nonreturn valve is configured as a construction unit which can be preassembled.

Cornering or sharp braking or accelerating of the motor vehicle can result in the washer fluid emerging from the washer nozzle because of the mass inertia of the washer fluid column of the washer fluid in the washer fluid pipe. This is particularly annoying in the case of the window cleaning system provided for a windshield or rear window. According to another advantageous development of the invention, emergence of washer fluid from the washer nozzle without the washer fluid pump being switched on can be reliably avoided if the nonreturn valve is pretensioned into a closed position by a force provided for sustaining a washer fluid column. As a result, the nonreturn valve can only be opened by a comparatively high pressure of the washer fluid pump.

The nonreturn valve could be provided with a closing part pretensioned against a valve seat counter to the direction of flow by a spring. However, in this case the closing part offers high resistance to the flow. According to another advantageous development of the invention, when washer fluid is conveyed by the washer fluid pump the nonreturn valve only insignificantly restricts the flow if the nonreturn valve is configured as a duckbill valve. Duckbill valves have at least two sealing lips which are opposite one another and are pretensioned against one another. In the open position the sealing lips are forced apart by the flow.

The window and lens glass cleaning system according to the invention has a particularly simple design if the washer nozzle is arranged on a retaining part and the nonreturn valve is clamped between a connecting branch of the washer fluid pipe and the retaining part.

According to another advantageous development of the invention, the heating element is only insignificantly cooled by the airstream if the retaining part has a recess for accommodating the heating element.

According to another advantageous development of the invention, a contribution to further reducing heat losses from the heating element is made if the recess can be closed by a flap.

According to another advantageous development of the invention, the installation of the retaining part is particularly simple if the retaining part is connected to the flap via a film hinge. This also makes it impossible for the flap to become lost before being installed.

According to another advantageous development of the invention, the retaining part is particularly cost-efficient if the retaining part is manufactured from plastic by injection molding. Furthermore by this means the retaining part, the film hinge and the flap can be manufactured in a single mold from which removal takes place axially.

According to another advantageous development of the invention, dirt adhering to the window/lens glass is rinsed away or at least partially dissolved by the washer fluid jet if the washer nozzle has a fluidic nozzle. Fluidic nozzles produce a particularly sharply defined washer fluid jet which swings to and fro. Partial dissolving of the dirt results in a further reduction in the wiper-lip wear.

According to another advantageous development of the invention, adaptation of the surface to be wetted to the wiping surface of the wiper lip is particularly simple if the washer nozzle has a flat-jet ball. Flat-jet balls produce a washer fluid jet which essentially extends in one direction, and therefore permit optimum adaptation to the window/lens glass surface which is to be wetted. The spherical configuration also enables the washer nozzle to be aligned in an infinitely variable manner.

The window and lens glass cleaning system according to the invention is constructed particularly cost-efficiently if the heating element is designed as a thick-film mesh.

According to another advantageous development of the invention, a complicated, temperature-dependent control of the heating element can be avoided in a simple manner if the heating element is designed as a PTC element. PTC elements of this type are also known as PTC resistors and have increasing electrical resistance as the temperature drops. Since the heating capacity of the heating element rises with increasing resistance, the invention means that the washer nozzle is reliably protected from freezing.

According to another advantageous development of the invention, the installation of the constructional unit comprising the washer nozzle and heating element on the motor vehicle is particularly simple if the washer fluid pipe is manufactured as one piece together with electric leads for supplying the heating element of the washer nozzle with electric current.

The invention permits numerous embodiments. To further clarify its basic principle, one of these embodiments is illustrated in the drawing and described below.

DETAILED DESCRIPTION OF THE PREFERRED EMBODIMENT

Figure 1:
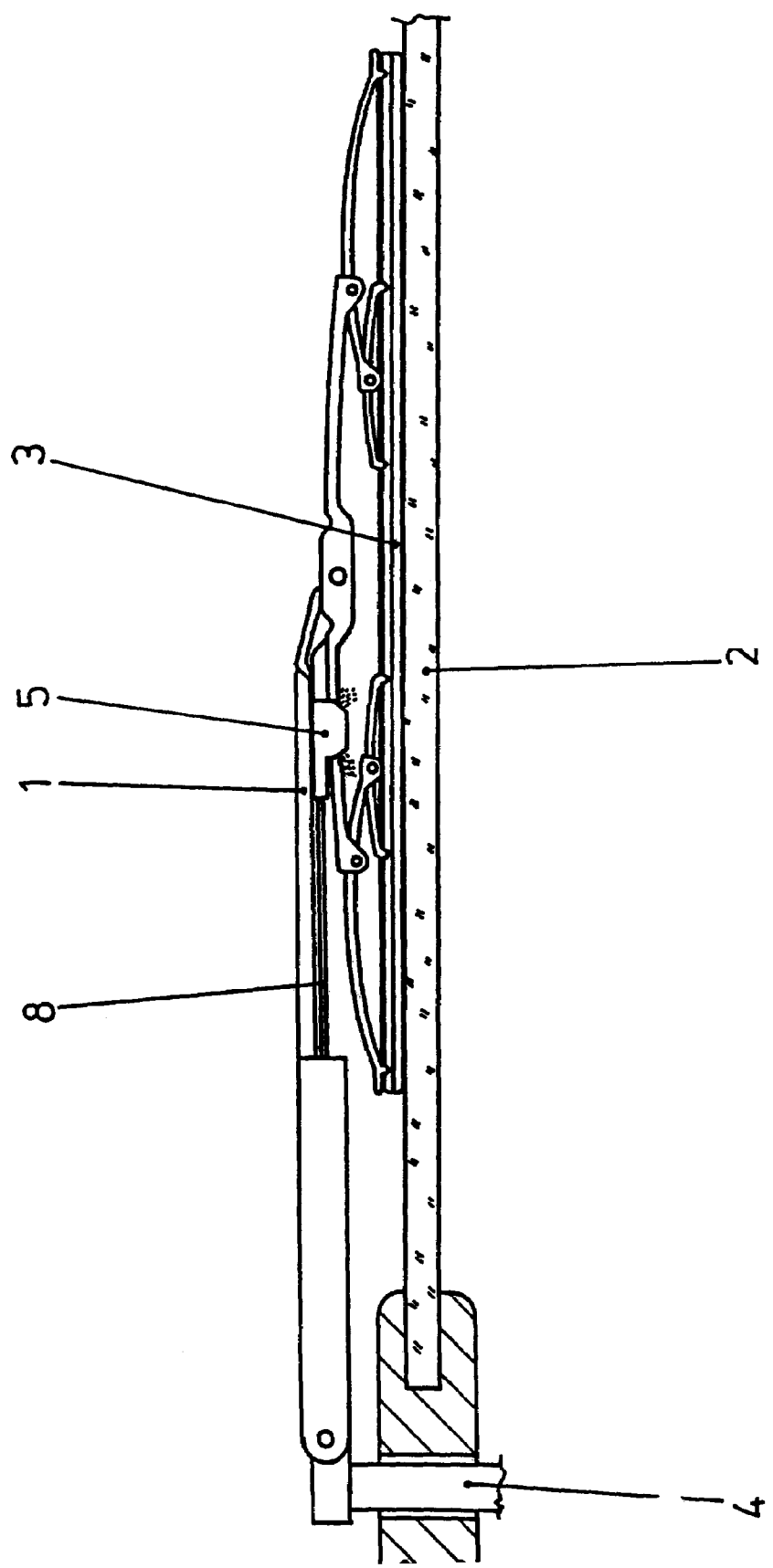
FIG. 1 shows a wiper arm having a retaining part for washer nozzles of a window and lens glass cleaning system according to the invention.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

Figure 2:
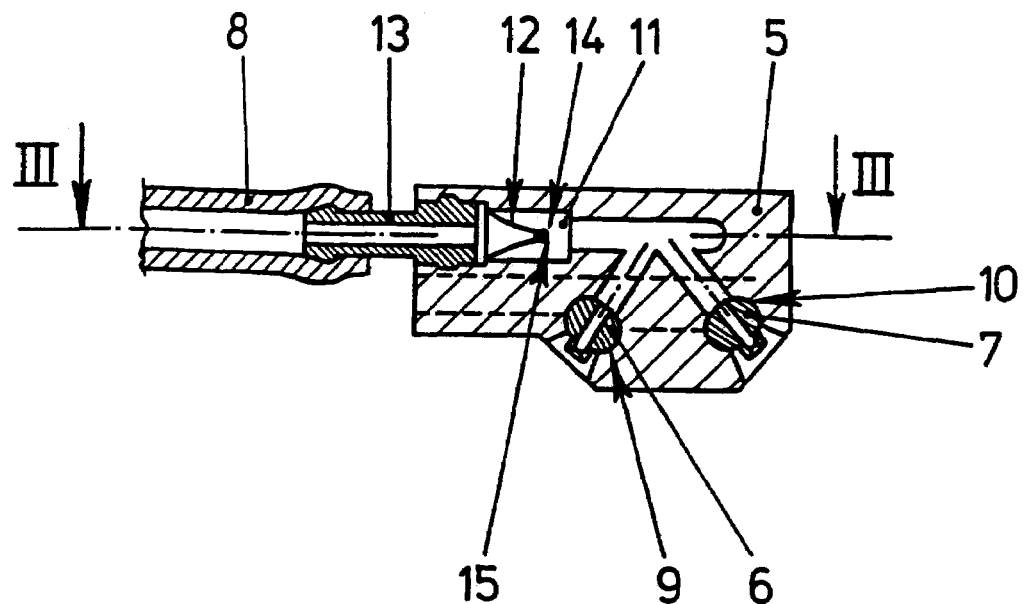
FIG. 2 shows the retaining part of the window and lens glass cleaning system from FIG. 1, in a longitudinal section.

FIG. 1 shows a wiper arm 1 having a wiper lip 3 which bears against a window/lens glass 2 of the motor vehicle. The wiper arm 1 is fastened on a shaft 4 which can be pivoted by a wiper motor (not shown). This enables the wiper lip 3 to be may, for example, be a windshield or rear window or else a lens for a headlight of the motor vehicle. The wiper arm 1 furthermore bears a retaining part 5 for two washer nozzles 6, 7, which are shown in FIG. 2. A washer fluid pipe 8 is connected to the retaining part 5. By this means, the window/lens glass 2 can be wetted with washer fluid.

FIG. 2 shows the retaining part 5 from FIG. 1 in a longitudinal section. It can be seen here that the washer nozzles 6, 7 are designed as flat-jet balls and are fastened in a spherical recess 9, 10 of the retaining part 5. This enables the spraying region on the window/lens glass 2 shown in FIG. 1 to be localized. The retaining part 5 also has a washer fluid channel 11 with a nonreturn valve 12 arranged in it. A connecting branch 13 for the washer fluid pipe 8 is pressed into the retaining part 5. The connecting branch 13 braces the nonreturn valve 12 in the retaining part 5. The nonreturn valve 12 is configured as a duckbill valve having two sealing lips 14, 15, which are pretensioned against each other, and opens at a designated high pressure of a washer fluid pump (not shown). When the motor vehicle is cornering or severely accelerating or braking, this measure prevents washer fluid from passing, due to its mass inertia, through the nonreturn valve 12 and wetting the window/lens glass 2.

Figure 3:
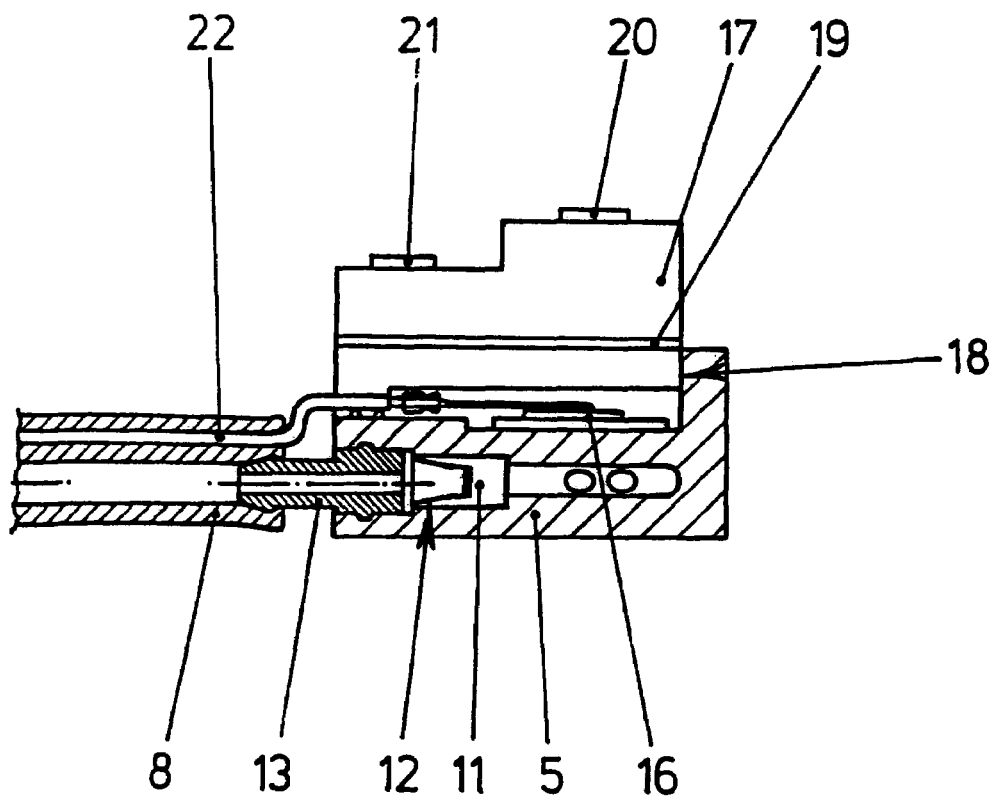
FIG. 3 shows the retaining part from FIG. 2 in a sectional illustration along the line II-II.

FIG. 3 shows the retaining part 5 from FIG. 2 in a sectional illustration along the line III-III. It can be seen here that an electric heating element 16 is arranged near to the washer nozzles 6, 7, which are shown in FIG. 2. For accommodating the heating element 16, the retaining part 5 has a recess 18 which can be closed by a flap 17. The flap 17 is connected to the retaining part 5 via a film hinge 19 and has latching hooks 20, 21 for the fastening to the retaining part 5. The heating element 16 is supplied with electric current via electric leads 22, which are manufactured as one piece together with the washer fluid pipe 8. The retaining part 5, together with the washer nozzles 6, 7, the heating element 16 and the nonreturn valve 12, forms a constructional unit which can be preassembled.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A window and lens glass cleaning system for a window or lens glass of a motor vehicle, comprising a pivotally mounted wiper arm for holding a wiper lip, which slides over the window or lens glass, said system comprising at least one washer fluid pipe which is mounted on the wiper arm, a connecting branch having a first end and a second end, wherein said first end is connected to said fluid pipe and wherein said second end is connected to a retaining part mounted on the wiper arm, the retaining part having a washer nozzle, wherein washer fluid situated in the retaining part is heatable with a heating element mounted to the retaining part in a recess for accommodating the heating element, wherein a nonreturn valve is located in the retaining part and arranged directly in front of the washer nozzle as seen in the direction of flow, wherein the nonreturn valve is configured as a duckbill valve, wherein said nonreturn valve is clamped between said second end of said connecting branch and said retaining part, wherein the recess can be closed by a flap, and wherein the retaining part is connected to the flap via a film hinge.

2. The window and lens glass cleaning system as claimed in claim 1, wherein the washer nozzle together with the heating element and the nonreturn valve is configured as a constructional unit which can be preassembled.

3. The window and lens glass cleaning system as claimed in claim 1, wherein the nonreturn valve is pretensioned into a closed position by a force provided for sustaining a washer fluid column.

4. The window and lens glass cleaning system as claimed in claim 1, wherein the retaining part is manufactured from plastic by injection molding.

5. The window and lens glass cleaning system as claimed in claim 1, wherein the washer nozzle has a fluidic nozzle.

6. The window and lens glass cleaning system as claimed in claim 1, wherein the washer nozzle has a flat-jet ball.

7. The window and lens glass cleaning system as claimed in claim 1, wherein the heating element is designed as a thick-film mesh.

8. The window and lens glass cleaning system as claimed in claim 1, wherein the heating element is designed as a PTC element.

9. The window and lens glass cleaning system as claimed in claim 1, wherein the washer fluid pipe is manufactured as one piece together with electric leads for supplying the heating element of the washer nozzle with electric current.

10. A surface cleaning system for a vehicle, comprising:
a wiper arm;
a fluid pipe mounted to the wiper arm;
a retaining part mounted to the wiper arm, the retaining part including a washer nozzle and a heating element, wherein the fluid pipe communicates with the retaining part and wherein fluid transported by the fluid pipe to the retaining part is heatable by the heating element;
a connecting branch having a first end and a second end, wherein said first end is connected to said fluid pipe and where in said second end is connected to said retaining part; and
a nonreturn valve located in the retaining part, wherein the nonreturn valve is clamped between said second end of said connecting branch and the retaining part, and wherein the retaining part has a recess for accommodating the heating element and the recess can be closed by a flap that is connected to the retaining part by a film hinge.

* * * * *